United States Patent [19]
Jeffrey

[11] Patent Number: 6,128,667
[45] Date of Patent: Oct. 3, 2000

[54] SYSTEM AND METHOD FOR DEFERRED RESOLUTION HYPERTEXT LINKS

[75] Inventor: Francis Jeffrey, Malibu, Calif.

[73] Assignee: Elfnet, Inc., Malibu, Calif.

[21] Appl. No.: 08/967,737

[22] Filed: Nov. 10, 1997

Related U.S. Application Data

[60] Provisional application No. 60/030,517, Nov. 12, 1996.

[51] Int. Cl.[7] .............................. G06F 13/00; G06F 15/00
[52] U.S. Cl. ...................... 709/245; 709/203; 709/218; 709/219; 709/228
[58] Field of Search .................................. 709/245, 218, 709/228, 203, 219; 395/701

[56] References Cited

U.S. PATENT DOCUMENTS

| | | | |
|---|---|---|---|
| 5,727,129 | 3/1998 | Barrett et al. | 706/10 |
| 5,784,058 | 7/1998 | LeStrange et al. | 345/340 |
| 5,802,292 | 9/1998 | Mogul | 709/203 |
| 5,805,815 | 9/1998 | Hill | 709/218 |
| 5,809,512 | 9/1998 | Kato | 707/502 |
| 5,812,769 | 9/1998 | Graber et al. | 709/228 |
| 5,907,704 | 5/1999 | Gudmundson et al. | 395/701 |
| 6,038,610 | 3/2000 | Belfiore et al. | 709/300 |

OTHER PUBLICATIONS

Strosnider et al., "The Deferrable Server Algorithm for Enhanced Aperiodic Responsiveness in Hard Real–Time Environments", IEEE Transactions on Computers, vol. 44, No. 1, pp. 73–91, Jan. 1995.

*Primary Examiner*—Zarni Maung
*Assistant Examiner*—Almari Romero
*Attorney, Agent, or Firm*—Wilson Sonsini Goodrich & Rosati

[57] ABSTRACT

Aspects of the present invention provide systems and methods for deferred resolution of hypertext links. A web page or other network page may contain tags used to select links to other pages. In an exemplary embodiment of the present invention, a network server evaluates tags selected by a user and may selectively defer following selected links. The deferred links may then be displayed and selectively followed by the user.

Additional aspects of the present invention provide systems and methods for using cell based computational units to evaluate tags selected by a user and selectively defer the requested actions. In an exemplary embodiment, a thread of execution may be initiated on a server for each deferred action and then be suspended using multi-processing techniques. The threads may then be selectively reactivated to initiate the deferred actions.

22 Claims, 8 Drawing Sheets

---

This is a newsletter about Meta-Frogs.

Meta-Frogs have supernatural capabilities. 305

The science of Meta-Frogs was founded by Dr. Hans Kroek [references (5)]

Meta-Frogs can be grown at home without much trouble. If you might like to consider ordering some [seeds, click here (6)] ← 306

Here is a picture of a ((Meta-Frog)) ← 310

Here is the sound of a ((Meta-Frog)) ← 312

301
TABLE OF CONTENTS:
To turn to [[ Page 1, click here (1) ]] to begin reading the Meta-Frogs news, or see pages
    [[ 2 (2) ]] ← 302
    [[ 3 (3) ]] ← 303
    [[ 4 (4) ]] ← 304

307
308 → If you are interested in [subscribing to MFN, click here (7)]

[[DONE? click here (8) ]] when you are finished reading about Meta-Frogs, and we'll provide a list of all the items you've expressed interest in while browsing The Meta-Frog News.

This is a newsletter about Meta-Frogs.

Meta-Frogs have supernatural capabilities. 305

The science of Meta-Frogs was founded by Dr. Hans Kroek [references (5)]

Meta-Frogs can be grown at home without much trouble. If you might like to consider ordering some [seeds, click here (6)] ← 306

Here is a picture of a ((Meta-Frog)) ← 310

Here is the sound of a ((Meta-Frog)) ← 312

301
TABLE OF CONTENTS:
To turn to [[ Page 1, click here (1) ]] to begin reading the Meta-Frogs news, or see pages
    [[ 2 (2) ]] ← 302
    [[ 3 (3) ]] ← 303
    [[ 4 (4) ]] ← 304

307
If you are interested in [subscribing to MFN, click here (7)]

308
[[DONE? click here (8) ]] when you are finished reading about Meta-Frogs, and we'll provide a list of all the items you've expressed interest in while browsing The Meta-Frog News.

Figure 3

Here is the information you requested--

(a) ordering seeds....

(b) references....

(c) subscriptions....

[fax this to you?] [e-mail this to you?] [connect to our ordering desk?]

Please confirm your instructions: [[ now DO IT ! ]] exiting MFN....

```html
<html>

<title> MFN Home Page </title>

<A href="branch5.ids"> <img src="button5.icon"> [references (5)] </A><br>

<A href="branch6.ids"> <img src="button6.icon"> [seeds, click here (6)] </A><br>

<A href="branch1.ids"> <img src="button1.icon"> [[ Page 1, click here (1)]] </A><br>

<A href="branch2.ids"> <img src="button2.icon"> [[ 2 (2) ]] </A><br>

<A href="branch3.ids"> <img src="button3.icon"> [[ 3 (3) ]] </A><br>

<A href="branch4.ids"> <img src="button4.icon"> [[ 4 (4) ]] </A><br>

<A href="branch7.ids"> <img src="button7.icon"> [subscribing to MFN, click here (7)] </A><br>

<A href="branch8.ids"> <img src="button8.icon"> [[ DONE? click here (8) ]] </A><br>

<hr>
<A href="buttonPOUND.ids"> <img src="buttonPOUND.icon"> | ELSE BACK-UP (#) | </A>

<A href="buttonSTAR.ids"> <img src="buttonSTAR.icon"> | POP-UP OVER-VIEW (*) | </A>

</html>
```

Figure 5

{MFN Home Page;

(text output to produce above .html with embedded literal text included)
~(corresponding sound object expressing same information in voice);
~(corresponding video map object expressing same information, and links);

??1{page1; ........}
??2{page2; ........}
??3{page3; ........}
??4{page4; ........}
?5{references; ........}
?6{seeds; ........}
?7{subscribing; ........}
??8{review and do; ........}

}MFN Home Page;

Figure 6

SYSTEM AND METHOD FOR DEFERRED RESOLUTION HYPERTEXT LINKS

RELATED APPLICATIONS

This application claims the benefit of provisional application No. 60/030,517, filed Nov. 12, 1996. Provisional application No. 60/030,517 is hereby incorporated herein by reference in its entirety.

BACKGROUND OF THE INVENTION

1. Field of the Invention

The field of the present invention relates in general to a system and method for structured computing and communications. More particularly, the field of the invention relates to a system and method for deferred resolution of hypertext links and of pointers of similar effect in a networked communication environment.

2. Background

The Internet, and the world wide web in particular, is becoming increasingly popular as a means for providing a wide variety of information and services to end users on demand. In addition, web pages are also being used on private intranets to provide services and information within a company or other organization. In such networks, users typically access information using software known as a web browser. In order to retrieve information from the network, the browser asserts the address of the information onto the network encoded in a Uniform Resource Locator or URL. The URL contains a specification of the protocol being used, the server upon which the information is located, and the path file name to the desired information within the file system of the server. For web pages, the HyperText Transfer Protocol (HTTP) is used to request the information. The selected HTTP server then retrieves the information and returns it over the network to the browser or other HTTP client. This scheme defines a web.

Information in these webs is typically arranged into pages that are displayed by the browser. The pages may include a combination of text and multimedia information (such as graphics and sound). Some of the information on the page such as images, icons or highlighted text may also function as tags. A tag represents a link (referred to as a hypertext link) to additional information that may be obtained from the same or other servers on the network. The page supplied by the server (typically as an .HTML file) provides both the information for displaying the tag (e.g., an icon) as well as an associated URL which is not displayed to the user. When the tag is selected by a user, the browser asserts the URL for the requested information. Importantly, the user does not need to be aware of the particular URL, but rather has only to request the desired information by selecting the appropriate tag. The process of retrieving web pages and then following hypertext links to related information is often referred to as web browsing. A relatively simple scripting language called HyperText Markup Language (HTML) is commonly used to define the contents of a web page. By merely specifying the data contents and tags for a page in HTML and loading that information onto a server, a web page can be easily created.

Web pages are being used for a wide variety of purposes. Among other things, publications may be displayed through web pages. References to sources of information, related articles, images and other information may be embedded in the text of the publication as tags (which may be displayed, for example, as highlighted text). These tags allow users to select and view related information merely by selecting the appropriate tag.

In some respects, however, web browsing is a disadvantageous way of presenting traditionally-structured media such as newspapers and magazines, in part because either (a) hypertext links to external material (such as references) are interruptive of such media, and (b) when such links are introduced they may lead to departure from the context of a particular structured publication, perhaps never to return. Consequently, it would be an improvement to provide, within the scope of web browsing, a method for selecting external links of interest, while deferring the act of following such links until the reader has completed browsing within the format and context of the particular organized publication. Similarly, nontraditionally-structured media presented as web pages may in some cases benefit from the availability of the same method of deferring links until some suitable time. For instance, it may be desirable to view a web page (which may represent a newspaper article) and select various tags of interest (such as tags which represent links to information on the people mentioned in the article). Rather than immediately jumping to web pages discussing the various people, however, it may be desirable to finish the newspaper article first and then have the choice of following one or more of the selected tags. Similarly the same capability may be beneficially applied to advertising and ordering products or services. Preferably, such deferred resolution of hypertext links may be implemented using a structured computation and communications system and method that can be readily adapted to other environments and new media. In addition, it is desirable to provide methods for specifying pages other than HTML, and pointers of similar effect as hypertext links.

SUMMARY

Aspects of the present invention provide systems and methods for deferred resolution of hypertext links. A web page or other network page may contain tags used to select links to other pages. In an exemplary embodiment of the present invention, a network server evaluates tags selected by a user and may selectively defer following selected links. The deferred links may then be displayed and selectively followed by the user.

It is an advantage of these and other aspects of the present invention that a number of links to related information may be easily selected while browsing without departing from the current context.

Additional aspects of the present invention provide systems and methods for using cell based computational units to evaluate tags selected by a user and selectively defer the requested actions. In an exemplary embodiment, a thread of execution may be initiated on a server for each deferred action and then be suspended using multi-processing techniques. The threads may then be selectively reactivated to initiate the deferred actions.

It is an advantage of these and other aspects of the present invention that deferred links may be easily implemented and conditionally modified din a structure multi-processing environment.

BRIEF DESCRIPTION OF THE DRAWINGS

Features of the present invention are described below in conjunction with the appended drawings in which:

FIG. 3 shows the text of a sample web page with deferred links;

FIG. 4 shows the text of a sample web page for reviewing and activating deferred links;

FIG. 5 shows simplified HTML used to generate the web page of FIG. 3;

FIG. 6 shows a simplified lineal code specification for a cell used to generate the web page of FIG. 3.

DESCRIPTION

A traditionally structured publication (newspaper, magazine, journal, book, etc.), when re-worked for presentation through http service, might include hypertext links for purposes such as the following:

A reference citation to other literature

The author or source of a news story

Another related news item previously or elsewhere published

Details or background not present in the hard copy version

Contact to an advertiser

Reader response feedback or activism (such as writing to a politician)

Etc.

The act of following any such link would depart from the context and format of the structured publication, perhaps never to return, since the destination of the link may be in another coherent set of web pages, or even on a distant site server. One way to maintain the sense, continuity and wholism of a structure publication would be to defer the following of such links until the time when the reader has a sense of having completed browsing the publication; then all the deferred links could be taken in turn, or reviewed and followed selectively. An exemplary embodiment of the present invention makes use of aspects of the systems and methods described in U.S. patent application No. 08/580,921 filed Dec. 29, 1995, which is hereby incorporated herein by reference in its entirety. U.S. patent application No. 08/580,921 is intended to supplement and be a part of the disclosure contained herein. A uniform system for providing deferred links may support operations using an http (web browser server) interface, a telephone (touch-tone input) interface, and other interfaces including interactive television.

First, the operation of an exemplary web page using deferred links according to aspects of the present invention will be described. Then the implementation of such a web page using aspects of the system and method described in U.S. patent application No. 08/580,921 will be described generally. Finally, the specific changes made to the branch evaluator algorithm in the system and method described in U.S. patent application No. 08/580,921 for purposes of implementing an exemplary embodiment of the present invention will be described.

Figure 1:
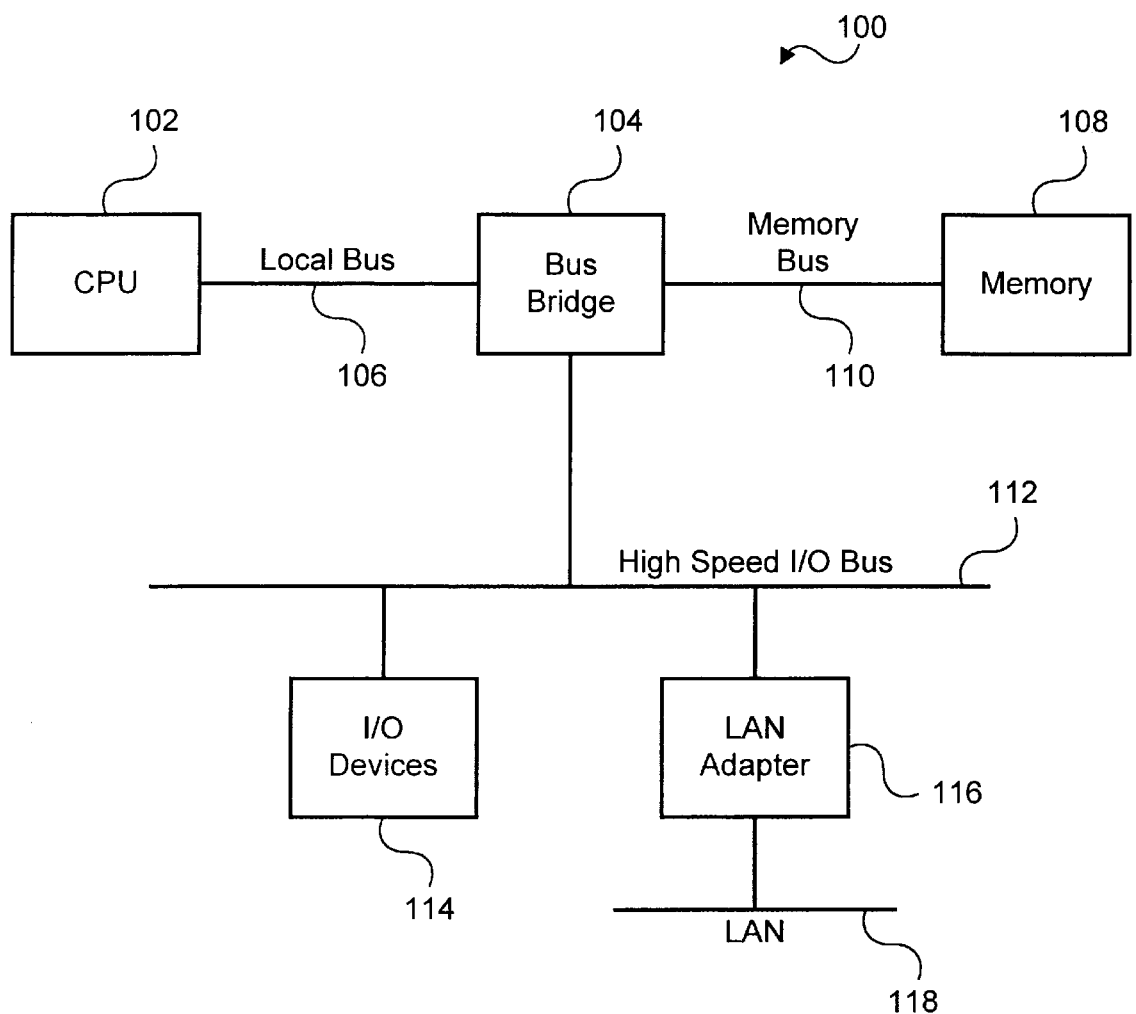
FIG. 1 is a simplified block diagram illustrating a computer system which may be used in conjunction with the first embodiment of the present invention.

In a first embodiment of the present invention, web pages may be supplied by web server software executing on a general purpose programmable computer. FIG. 1 is a simplified block diagram illustrating a general purpose programmable computer system, generally indicated at 100, which may be used in conjunction with a first embodiment of the present invention. In the presently preferred embodiment, a Next™ computer containing a Motorola 68040 microprocessor, and running the NextStep operating system is used. Of course, a wide variety of computer systems may be used, and it should be understood that it is an advantage of the present invention that it may be used across different computer architectures. Examples of such computer systems include without limitation workstations or servers running Unix versions such as BSD 4.3 (or later) or System V Release 4.3 (or later), or other operating systems such as SunOS 4.1, DEC OSF/1, Open VMS, or Microsoft NT, and IBM compatible personal computers running Windows NT, O/S2 or Plan 9. FIG. 1 shows one of several common architectures for such a system. Referring to FIG. 1, such computer systems may include a central processing unit (CPU) 102 for executing instructions and performing calculations, a bus bridge 104 coupled to the CPU 102 by a local bus 106, a memory 108 for storing data and instructions coupled to the bus bridge 104 by memory bus 110, a high speed input/output (I/O) bus 112 coupled to the bus bridge 104, and I/O devices 114 coupled to the high speed I/O bus 112. As is known in the art, the various buses provide for communication among system components. The I/O devices 114 preferably include a manually operated keyboard and a mouse or other pointing device, sound recording devices, voice (with touch-tones) and data telephony for input, a CRT or other computer display monitor, speakers, head phones, voice (with touch-tones) and data telephony for output and a disk drive or other storage device for nonvolatile storage of data and program instructions. In addition, a local area network (LAN) adapter 116 is connected to the high speed I/O bus 112. The LAN adapter 116 allows computer system 100 to communicate with other devices over a LAN 118. Of course, other networking and communications connections may be supported through other adapters, modems, and the like.

The operating system typically controls the above identified components and provides a user interface. The user interface is preferably a graphical user interface which includes windows and menus that may be controlled by the keyboard or pointing device, plus voice sound and music recording and playback devices. Of course, as will be readily apparent to one of ordinary skill in the art, other computer systems and architectures are readily adapted for use with embodiments of the present invention.

Figure 2:
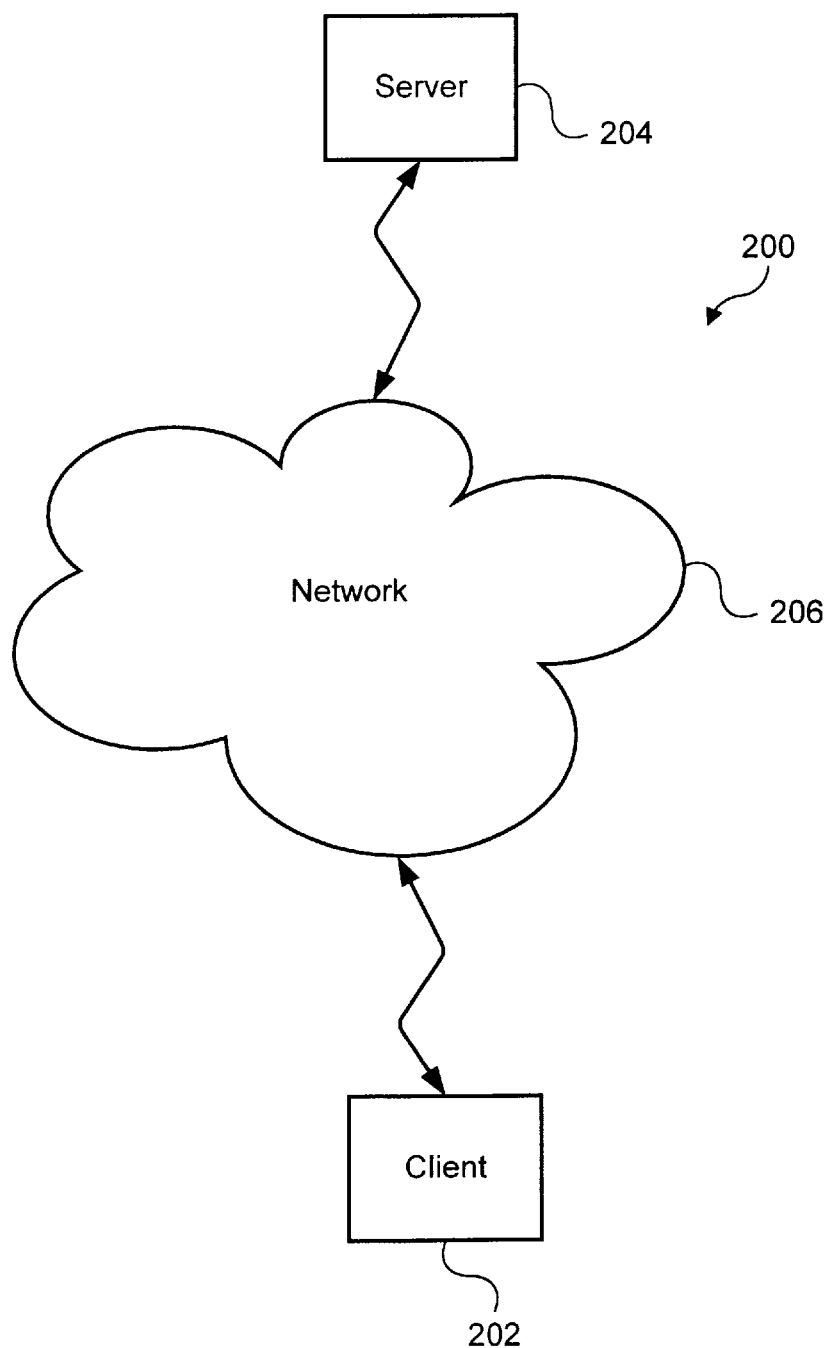
FIG. 2 is a simplified block diagram illustrating a computer network which may be used in conjunction with the first embodiment.

FIG. 2 is a simplified block diagram illustrating a computer network, generally indicated at 200, which may be used in conjunction with a first embodiment of the present invention. For illustrative purposes, aspects of the first embodiment will be discussed within the context of an HTTP client computer system 202 executing conventional web browser software and an HTTP server computer system 204 executing web server software according to a first embodiment of the present invention. The client 202 and server 204 communicate through network 206 which may be the Internet, an intranet, or other communications network.

The web server software according to the first embodiment provides for special types of links on a web page. In particular, the web server software distinguishes between deferred links and immediate links. An immediate link works like a conventional hypertext link. When an immediate link is selected by a user, the desired action is taken immediately (or as soon as the server can respond). A deferred link causes a thread of execution to be initiated to take the requested action, but it is suspended before the action is actually taken. When the user indicates that the current web page is finished (by selecting a special immediate link), the deferred links can be selectively reactivated to take the deferred actions.

In order to follow the above types of links, each link generates a GET request with a URL that references either an existing file or a non-existent file on the server (referred to as a "sham file"). The sham file names are intercepted by a process executing on the web server and evaluated against a set of branches for the given web page. If the sham file name matches the condition for an immediate branch, the web server processes it immediately. (If it is a request for information available on the same server, it can be processed directly; if it is a request for information found on another server, a normal URL can be asserted on the network on behalf of the client.) If the sham URL matches the condition for a deferred branch, the web server initiates a thread of execution pointing to a set of instructions that will cause the desired action to be taken, but this thread of execution is immediately suspended using conventional multi-processing techniques. The desired action is taken only later when the suspended thread of execution is re-activated. One of the immediate links may cause a web page to be generated to display the deferred links, so the user can review and selectively reactivate the deferred links after the user has finished with the current web page. Any thread that is not selected may be terminated.

FIG. 3 illustrates a sample web page displayed in text only format. The web page contains the text of a newsletter about a fictitious company called Meta-Frogs. The web page contains text about Meta-Frogs as well as various tags (in the form of buttons) representing links to other information. There are three types of links represented on the web page. The first type of link is an immediate link to related web pages. The tag for an immediate link to another web page is indicated by double square brackets in FIG. 3. See tags 301, 302, 303, 304 and 308 in FIG. 3. The second type of link is an immediate link for viewing images or other immediate data (such as a sound file or movie) and is indicated by double parenthesis in FIG. 3. See tags 310 and 312. The third type of link is a deferred link. The tag for a deferred link is indicated by single square brackets in FIG. 3. See tags 305, 306, and 307 in FIG. 3.

For each type of link, the text in the brackets would be displayed by a browser in a manner indicating that it represents a selectable hypertext link. The browser does not have to know whether each tag represents an immediate or deferred link. For each tag (supplied by and referencing our server and encoding a sham file name), there is an entry in a branch table in the web server software that indicates whether the link is immediate or deferred. When the tag is selected, it sends a URL to the web server software encoding a sham file name that matches the condition for the appropriate branch. For the sample web page of FIG. 3, the branch number corresponding to the particular tag is indicated in parenthesis inside the brackets. For example, the deferred link "[references (5)]" indicated at 306 in FIG. 3 is a deferred link that returns a URL to the web server software encoding a shame file name that matches the condition for the fifth branch in the branch table. When the condition is met, a thread of execution is generated and suspended. The thread of execution points to instructions that will either serve a page file from the server (which may be currently stored on the server, accessed by it, or generated by it) or else generate a real URL (on the net) for the link when the thread of execution is reactivated.

In addition to the links described above, certain operations may be generally implemented for all web pages supplied by the server. For the exemplary first embodiment, a "#" symbol is used to represent a command to return to the previous web page displayed by the browser (which is similar to the "Go Back" command in many conventional browsers), and a "*" symbol is used to represent a command to cause an overview or context-sensitive help to be displayed (which is similar to the "Help" command in many conventional browsers but is generated by the server).

When the deferred links 305, 306 and 307 are selected, the tags may take on a different appearance to indicate that they have been selected (e.g., the highlighting may change color or be removed), but no other immediate action visible to the browser's user will be taken. When immediate link 308 is selected, it will cause a display of those deferred links that have been previously selected and ask the user to review the choices for execution. For instance, a web page such as that shown in FIG. 4 may be displayed. The user may also have the choice of selectively deactivating the threads representing some of the links, at this point. When the immediate link 402 is selected ("[[now DO IT !]]"), the web server reactivates all remaining dormant threads of execution and the selected actions take place using multi-threaded multi-processing. Those actions which entail serving additional web pages from our server (or asserting a URL specifying a different server) may be sequenced at this point to occupy the foreground browser window sequentially or allowed to trigger multiple browser windows (only when this facility is available).

An exemplary HTML definition for the exemplary web page (using the symbols described above) is illustrated in FIG. 5. This HTML is output by the web server software and sent to the client browser which displays the web page. For purposes of clarity, the HTML for displaying the literal text has been deleted. In addition, redundant graphical icons for each link have been added in FIG. 5.

The web server software according to the first embodiment may be implemented using cell based computational units as described in U.S. patent application No. 08/580,921. An overview of the basic structure of a cell is described on pages 17–30 of U.S. application No. 08/580,921 which is incorporated herein by reference. A cell is organized into structured sections and multiple cells may be linked through paths. A processor or thread of execution (referred to as a processionist) traverses the cell and executes instructions and evaluates conditions in the cell. The processionist may selectively follow paths (or engender additional parallel processionists to follow paths) to execute additional cells based on the evaluated conditions. When multiple processionists diverge from a cell, they may converge back to the cell through a process called recession. Selected processionists may be returned to parent cells while other processionists may be extinguished. Cells and paths may thereby be used to control extensive multi-processing through structured computational units.

Cells include an output behavioral section which contains executable code for outputting values from the cell and performing other operations. After the output behavioral section has been completed, the processionist executes instructions in a path selection section. The path selection section contains executable code and conditions for determining which paths emanating from a cell should be followed by the processionist. A special module called the branch evaluator is used to determine which paths to follow. The branch evaluator may be reentrant code shared by many cells within the same address space. The branch evaluator implements a branch selection rule that regulates whether processionists move from one cell to another within the system. The actual conditions that are evaluated for each referenced cell are contained in a branch table within the cell. The path selection section contains a mechanism for dispatching processionists on the appropriate paths. In the first embodiment, this may be accomplished by requesting new threads of execution from CPU 102 to follow additional paths (the existing thread would follow one of the paths itself).

In the first embodiment, a cell may be used to encapsulate the behavior of a web page. The output behavioral section may be used to generate HTML for the web page, and the path selection section may be used to determine how hypertext links are handled. As described above, hypertext links may be implemented by URLs incorporating sham file names. Strings encoded in the sham names are used to match the conditions in the branch table of the path selection section. If the string matches a condition in the branch table, the corresponding path may be followed (or such action may be deferred as described further below). For example, FIG. 6 shows lineal code defining the contents of a cell used to generate the web page shown in FIG. 3. The use of lineal code to specify the contents of a cell is described further in Application No. 08/580,921 which is incorporated herein by reference.

Multiple cells may be interconnected to form a multi-threaded, multi-processing system, which may be distributed over multiple hosts. A per-user interface is referred to as a "session", and generally corresponds to a "task", which may have any number of threads within it. (Additionally, other tasks, such as system utility tasks, may be present on a host.) A user may cause cells to be traversed and information to be retrieved through interfaces such as a touch tone phone or web browser.

A session can largely be understood as a set of input and output channels, associated with a client/user and a set of "processionists" (i.e., processors, processes, threads), that temporarily handle the input and output of every cell that any of those processionists enter and traverse. Typically there is a "main" processionist representing an individual user, from which additional processionists may be engendered (divergence), and into which they may coalesce (convergence). This main processionist is generated by the session program (e.g., waiting on a telephone line) when it answers the phone and injects the processionist into the system at a pre-designated cell location. Thus the processionist set is owned by the user, and is extinguished when the user eventually completes the session. In the case of the telephone interface, which is per-line, the corresponding session program is then re-cycled to be available for a new user calling in on the same line in future; but for the Internet web interface, which is inherently multiplexed so that the maximum potential number of clients is indeterminate, a session is generated as each new client does a "connect" to the Internet site, and maintained in correlation with the client's IP address (or other available identifier) until an explicit exiting is signaled (which is not a standard web client feature), or the connection is timed-out due to inactivity.

Multi-threaded I/O in the system is handled through the session currently operating a particular processionist (or processionist set), so the standard I/O for a particular cell at any moment is the I/O designated for the processionist passing through that cell, and its corresponding session. Output is therefore intended for a particular user/client, and as is conventional, serves for the delivery of information and for prompting for requested input. Corresponding input is for the reception of data from the client, and for selection of options. Options may, for example, include following various paths from a cell contingent on certain conditions.

A browser page file is produced from the actual (existential) output generated by a cell, not by copying the output behavioral section as represented in the cell. The output behavioral section may include HTML which is output in its original form, or a transformation may be applied to the output behavioral section of an existing cell to generate HTML. A transformation may be used, for example, to allow cells originally designed for a telephonic interface to generate a corresponding web page (where the options are displayed in text instead of audio, and tags are used to select options instead of touch tone keys on the phone).

The web server software maintains a level of synchronization with the user as the user browses various web pages on the server. This is accomplished by building each served page with sham GET requests or other commands which are returned to the server as the user browses within a session. For instance, using a sham GET that is sent to the server each time a web page is loaded in the foreground browser window allows synchronization despite conventional web browser features such as the "back-up" button. Browsers typically cache pages browsed so that the "back-up" button may be used to revisit a page locally, without downloading the HTML file again through a new GET operation. Without synchronization, if a browser backs-up, it becomes de-synchronized from the cellular net system. The cellular network system always expects responses based on the page it most recently generated, because that page represents the current cell and its contingencies.

Therefore, within the system framework, a general escape, or "pop-up" facility may be used to facilitate synchronization. This facility provides for a suspension of cell-network branching choices while an over-view is provided (help!, where-am-I?, go to!, etc.) preserving contexts for resumption, as well as providing for optional exit or re-direction.

At the top of every served web page file a re-sync $.path string may be included. Whenever the page is loaded in the foreground browser window, the string is transmitted to the server as a sham GET. The server will recognize this as a match to one in its list of recently served pages (and the corresponding cell), and not as the most recently served page file. It will then activate the appropriate part of the infrastructure of the "pop-up" facility to re-direct the current-client processionist to the indicated cell. Thus the cell will re-run (generating output which in this case is discarded, since the corresponding page is already cached in the browser client) and will wait at its input-matching branch contingencies for client input as if the corresponding page had been served for the first time. To handle those cases in which the current value of the processionist (of the respective client) is significant, there is, in parallel with the list of recently served pages, a list of processionist contexts corresponding to the jumping-off point for each of those pages. This, and the parallel page list, are maintained individually for each client's main thread.

As described above, links on a web page can be treated as conditional branches in the branch table of a cell. These branches can be used for following links as in conventional browsing as well as for deferred links and other special processing. In the first embodiment, the system is implemented by a minor variation of the "selection rule" embodied in the "branch evaluator" as described in pages 45–59 of U.S. patent application No. 08/580,921 which is incorporated herein by reference. The selection rule described in U.S. patent application No. 08/580,921 can be summarized as: "Select all unconditionals and all nonexclusives whose conditions are satisfied, UNLESS any exclusive satisfies its condition, IN WHICH CASE select only that one and no others. If several exclusives are present, take the first one satisfied, excluding the others." The varied rule according to the first embodiment of the present invention can be summarized as follows: "Select all unconditionals and all non-exclusives whose conditions are satisfied, UNTIL any exclusive satisfies its condition, AT WHICH TIME select only that one and no others. If several exclusives are present, take the first one satisfied, excluding the others." If the branch that is followed is of a deferred type (i.e., non-exclusive), a processionist will be initiated and placed in a suspended state for later activation. The variation on the rule results in the "time window" for branch evaluation being defined so as to open following the completion of the output of the current cell (which draws the web page), and to close at the time that an input satisfies any exclusive conditional (typically by implicit matching with input).

Relying on this new rule, the hypertext links desired to be deferred are translated into strings that satisfy non-exclusive conditionals on branches of the current cell (corresponding to a current web page). The particular cell is constructed incorporating (or making use of as shared code) the varied branch evaluator, referred to as BED (Branch Evaluator Deferred version). The BED has two additional specializations for this role: (i) The lead processionist is never dispatched on a branch whose contingency rule is a non-exclusive conditional (or unconditional); and (ii) Whenever it dispatches a processionist on a branch whose contingency rule is a (deferred) non-exclusive conditional, the processionist is dispatched in a suspended state, such that upon arriving at the destination cell it remains suspended until explicitly re-activated. In the first embodiment, this means that a thread is initiated and the program counter associated with the thread points to the next instruction to be executed to dispatch the processionist to the desired cell. The appropriate "sleep" bit is set for the thread to put it in a suspended state. An exclusive branch, on the other hand, involves dispatching an active processionist to the desired cell right away. A special exclusive branch may be included on the web page to allow review and activation of suspended links by the user as described above with reference to FIG. 4 or, in some instances, the deferred links (and corresponding suspended processionists) may be automatically reactivated without review when the special exclusive branch is selected.

The resulting behavior, when browsing, typically is as follows. Each link intended to be deferred is encoded (when the page is drawn from the output of a cell) as a GET request of a sham file from the http server, such that the sham file name encodes a string satisfying (typically by implicit literal matching with input) the non-exclusive conditional of a contingent branch. Each link intended NOT to be deferred is encoded (when the page is drawn from the output of a cell) as a GET request of a sham file from the http server, such that the sham file name encodes a string satisfying (typically by implicit literal matching with input) the exclusive conditional of a contingent branch. Typically such links will represent page changes within the format and context of the structured publication, intended to be accomplished immediately, or links signifying that the reader considers browsing of the publication to be complete. The latter links (i.e., those signifying completion) will be to a cell programmed to orchestrate the review and following of the deferred links, by explicitly re-activating suspended processionists (belonging to the particular reader's session). The above behavior may be implemented by making minor changes to the branch evaluator algorithm described in U.S. patent application No. 08/580,921.

Overview of Branch Evaluator Deferred Version

Figure 7A:
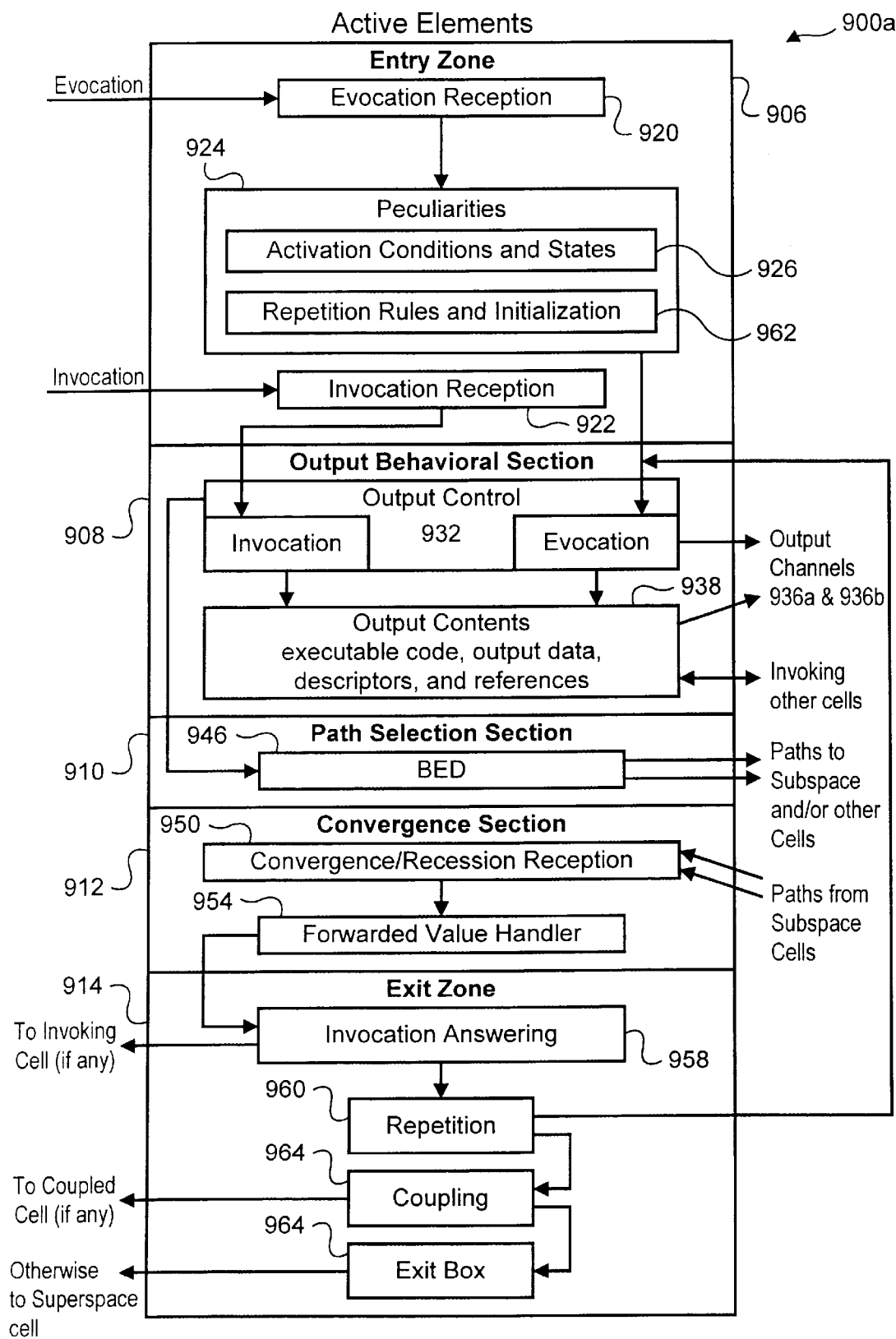
FIGS. 7A and 7B are block diagrams illustrating the structure of a cell according to the first embodiment.
Figure 7B:
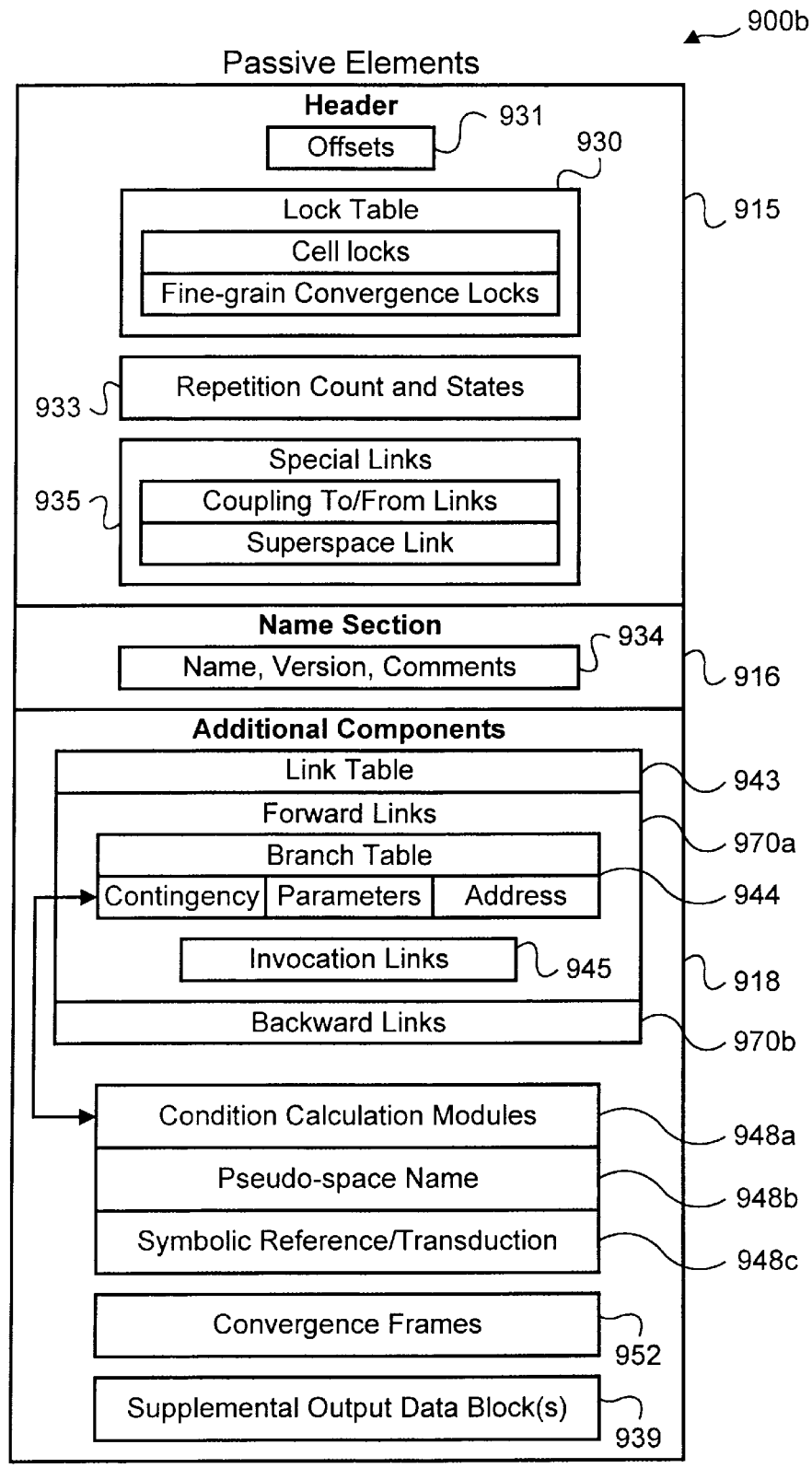

The following description of the BED makes reference to FIGS. 7A and 7B which show the structure of a cell according to the first embodiment. This description is based upon the description of the branch evaluator ("BE") in application No. 08/580,921, but has been modified to allow for deferred links. The peculiarities section 924 of the cell may contain a flag to indicate whether the original branch evaluator or BED is used for a particular cell. This allows both types of cells to be used within a single cellular network system.

In the system according to the first embodiment, the path selection section determines which cells will be evoked by the current cell. A branch table 944 (which is part of the forward link table 970*a*) contains all of the possible evocation paths from the current cell. Each entry in the branch table 944 contains a contingency specification referencing a conditional statement (if applicable) which is evaluated to determine whether the path should be followed, branch parameters (including type), an address of the next cell on the path, and a registration section for recording the identification of the processionist sent down the path. The BED 946 traverses through each entry in the branch table 944 to determine which paths should be followed and to initiate new processionists (threads of execution) to follow the paths if necessary. The additional components 918 may also contain variable length information for each entry in the branch table 944 as appropriate (indicated at 948*a*, 948*b*, and 948*c*). This variable length information may include a condition calculation module 948*a* containing information to be used by the branch evaluator to evaluate the conditional statement for a particular branch, the pseudo space name 948*b* (if any) that may be associated with a branch that is not to a subspace cell, and a symbolic reference or transduction code 948*c* for branching to a cell that is not to a virtual address in the same cell clump. The symbolic reference/transduction 948*c* is important for branches requiring more than a memory jump command (i.e. a branch across a computer network or other heterogeneous technology). For instance, to branch across a communications network, the address of the cell (the symbolic reference) would include the network node address as well as the identification of the particular cell at that node. The transduction code would cause the processionist to send an appropriate network packet addressed to the appropriate node, and then terminate (thus transducing the processionist from a thread to a packet). The receiving node would receive the packet and initiate a new thread and insert it into the specified cell.

In the first embodiment, the BED 946 is implemented as code that may be shared among multiple cells in the system to avoid redundancy. The BED 946 is preferably reentrant code external to the cell (although for illustrative purposes it is shown within 910 in cell 900 in FIG. 9). Each time a processionist traversing a particular cell reaches its path selection section 910 a cellFrame is used to keep track of information specific to the operation of the branch evaluator for the current cell. Among other things, the cellFrame stores the current cell's address as well as a pointer to the current value, and indices into the branch table 944 used for branch evaluator operation.

Because the BED is informed of which cell it is subserving (or located in, in the case of individual copies in each cell), as well as the identify of the other cells to which it is dispatching procession(s) from the cell, a minor enhancement of the BED (such as a JSR to a special routine) would enable the position of a processionist to be posted each time it traversed a cell, and then a concurrent process could easily create a copy as soon as a processionist has passed through each such cell, thus creating a personalized copy of a subdivision of a network frequented by a particular processionist, which might represent the interest of a particular user.

The path selection section 910 allows the system of the first embodiment to achieve unification of parallel and serial constructs and methods through a generalization of contingency branching, followed in appropriate instances by controlled convergence. Essentially, the operation of the path selection section 910 is specified such that a processionist may diverge from the cell on a subset of its branches in the branch table. By this principle, concurrent activity may be engendered and maintained for as long as desired; or alternatively, activity may be restricted to a choice of a single path among several, or none of them.

If one or more branches project from a cell (i.e., in the branch table), then depending on the existential situation when the processionist reaches the path selection section 910 of that cell, the processionist may follow one or more of these branches, according to the selection rule implemented in the branch evaluator 946. The existential situation dictates whether the conditions for each branch will be evaluated true at the moment of branch selection. If none of the conditions in the branch table 944 evaluate to true, then no branches are taken and the processionist goes to the cell's exit zone 914.

Each branch in the branch table 944 has an explicit or implicit condition that must be evaluated to determine whether the corresponding path should be taken. A branch may have a condition that depends upon an explicit comparison of values or on an implied comparison with input or truth. As described above, the conditions may comprise text strings that are to be matched with input consisting of corresponding strings encoded in sham file names in URLs generated by a web page. If there is no express condition, then the branch is implied to be unconditional. A path may also be designated as blocked, in which case it will not be followed under any circumstance. Express conditions may be specified as mutually exclusive or as nonexclusive. Those that are unconditional are inherently nonexclusive.

The selection rule implemented by the BED 946 selects every path with a satisfied condition or no condition; provided, however, that if the branch table 944 contains a condition that is exclusive and satisfied (i.e. it evaluates to true) then after the first of these exclusive conditions is selected no further paths are selected and the BED is done.

So long as there is no exclusive condition that is satisfied in the branch table 944, then the branch evaluator 946 will send a processionist down each path in the branch table 944 that is unconditional or has a nonexclusive condition that is satisfied. As described above, these processionists may be placed in a suspended state for deferred execution.

In the BE, if no paths are selected, the processionist goes to the exit zone 914, which is the same point to which processionist(s) would have been expected to arrive had one or more processionists been dispatched along paths and then converged through the convergence section 912. However, in the BED, it instead resumes at the beginning of the BED, there awaiting a further input.

In summary, conditions for paths in the branch table 944 can be of the following types: a) exclusive and immediate (explicit comparison, logical value, or implied match with input); b) nonexclusive and deferred (explicit comparison, logical value, or implied match with input); c) unconditional and deferred (like a nonexclusive conditional that is always met); or d) blocked (like a conditional contingency that is never met).

The selection rule implemented by the BED 946 can be summarized as: select all unconditionals and all nonexclusives whose conditions are satisfied, until an exclusive satisfies its condition, in which case select that one and no others thereafter. If several exclusives are present, take the first one satisfied, excluding the others. As a practical matter, in the first embodiment, the "first" exclusive condition satisfied will be based upon the chronological order that the entries were placed in the branch table 944, unless a later entry is explicitly re-positioned in the branch table by an express command. (In other embodiments, priority could be left to be determined by real-time exigencies, such as the order of arrival of inputs satisfying implicit matching conditions—that is to say, the first decision that can be reached based on available data.)

Of course, whether a condition is satisfied may depend upon the moment in time that the condition is evaluated. Due to implementation of the path selection section using serial computation, the "moment of evaluation" may actually be a time window of a certain length. In the first embodiment, the time window starts when the web page is displayed and ends when an exclusive condition has been satisfied. Each time a sham-encoding URL is received by the server, the BED is re-activated and the conditions are evaluated. Existential circumstances may be re-evaluated each time a URL encoding a sham file name is received. An inactivity timer may be provided in the input stage such that if no input or links within a certain interval (for each cycle of the BED) then the client will be inferred to have disconnected, so the session will be terminated and all its resources freed, including threads (processionists), and the BED cell frame, leaving the cell in its initial, unlocked state.

Notes on Implementation and Lineal Code for Branch Evaluator Deferred Version

The BED is present in each cell that requires branch selection, or alternately exists as referenced shared code, of which there may be any number of copies present serving a group of cells (one copy per virtual address space is most efficient for current computer architectures). To be efficiently shared, the object code should be re-entrant. The lineal code expressing the BED algorithm is preferably interpreted into machine language for specialized, optimal performance, although it can itself be constructed from a number of cells, in principle. The BED is a serial algorithm, worked by only one processor (or thread) for each processionist traversing a cell. Note that multiple concurrent processionists may share the BED without interference. Access is provided to additional processors as needed to be "dispatched" via pointers in the branch table. (As a consequence, the BED itself could in principle be implemented by a group of cells, with their branch selection subserved by a simpler "branch evaluator" that handles only bifurcations.)

In summary, the BED can be understood as follows: It may be part of a cell. It operates on the branch table of that cell. It can effect the evocation of other cells (or of the cell of which it is a part). The BED itself is expressed in the following algorithm in a lineal form that represents a group of interconnected cells.

Variables:

Branch table branch ("item") number indices: C=currently considered branch, N=next, F=forward check for presence of TRUE exclusive. The advance of C and N are coordinated so as to assure that parallelism is available to select multiple branches when appropriate; before dispatching a processor on a branch, F steps ahead of N to check for the presence of a TRUE exclusive conditional. B is the total number of branches ("items") in the branch table.

Analysis of initial conditions:

B=0, BED can handle its Forward branch table, but is not actually needed.

B=1, use of specialized versions of branch evaluator could achieve greater speed and economy; so also with various other special cases of particular collections of branch types.

B>=2, is the normal case.

Tests, prefixed with ?? and meta-commands, beginning with !! are elaborated below. Comments, as opposed to commands or meta-commands, begin with !!!. Simple commands begin with "!" but the only one utilized here is an instruction to increment a number (i.e., !increment, x).

All contingencies are exclusive. ?? conforms with lineal code conventions for exclusives. (The exclusive behavior is also forced here by the fact that the processionist is restricted to being singular, so no divergence—i.e., parallel branching—is possible within the branch evaluator itself.) Stated conditions on contingent branches are functions of truth value, which could be implemented as cells invoked, although only the meaning of the test and not its implementation is specified here. A result with the value TRUE allows the branch to be taken, and thus the corresponding space entered and evoked. Cell (space) names are taken as global within the scope of the algorithm.

Note that a cellFrame has been established previously upon entry to the cell. This cellFrame is used by the processionist for the cell during the branch evaluator's execution as a scratchpad for the BED's variables (C, N, F, etc.) and allows the BED to be used reentrantly.

The following illustrates the BED's algorithm using a lineal code representation:

```
{BED; ~!!!start here;
    {initialize; ~1>>>C; 2>>>N; 0>>>F;
    ??~=end C {Done; ~!!sleep until next input; {:BED}!!! . . . then start over}
    {C Loop; ~!!!consider the Cth item;
        ?~=Blocked C{C False Result 2; ~!increment, C; C+1>>>N;
        ??~=end C {:Done}
        {:C Loop}
        }C False Result 2;
        ??~=Unconditional C{:X}
        {C Test; ~!!computetheconditionalforCthitem;
            ??~=True C{C True;
                ??~=Exclusive C{Result 3; ~!!dispatchleadprocessoronbranchC}
                {X; ~
                    ??~=end N{:Result 9; ~!!!because C+1 spot is empty, seegamma}
                    {Y; ~!!consider the Nth item;
                        ??=Blocked N{N False Result 5; ~!increment, N;
                            ??~=end N {:Result 9}
                            { :N Loop} !!! now in spread mode, see(*);
                        }N False Result 5;
                        ??~=Unconditional N {N Ture; ~!!!consider the Nth item;
                            ??~=Exclusive N{Result 4; ~!increment, C; {:Result 3}
                            {Result 1; {:two OK} }
                        }N True;
                        {N Test; ~!!computetheconditionalforNthitem;
                            ??~=True N{:N True}
                            {:N False Result 5]
                        }N Test;
                    }Y;
                }X;
            }C True;
            {:C False Result 2}
        }C Test;
    }C Loop;
    }initialize;
?{N Loop; ~!!!consider the Nth item;
    ??~=Blocked N{Result 7; ~!increment, N;
        ??~=end N {:Result 9}
        {:N Loop}
    }Result 7;
    ??~=Unconditional N{N True Spread; ~!!!consider the Nth item;
        ??~=Exclusive N{Result 6; ~N>>>C; {:Result 3}
        }
        {Result 8; {:two OK}
            ~!!!knowing both C&N are true & non-exclusive;
        !!!+ spread mode will end at "lead processor continues";
        }Result 8;
    }N True Spread;
    {N Test Inner; ~!!computetheconditionalforNthitem;
        ??~=True N{:N True Spread}
        {:Result 7}
```

-continued

```
        }N Test Inner;
    }N Loop;
!!![the following is evoked from results 1 and 8]
?{two OK; ~!!! look out for true exclusives ahead before you request'p;
    ??~F=1 {:request processor; ~!!!because test was previously passed}
    {check ahead; ~N+1 >>> F;
        ??~=end F{:request processor}
        {check F; ~!!!consider the Fth item;
            ??~=exclusive F{F is exclusive; ~!!computetheconditionalforFthitem;
                ??~+True F{ ~F>>>C; {:result 3; ~!!!lead'p will take Fth branch} }
                {:skip it}
            }F is exclusive;
            {skip it;    ~F+1>>>F;
                ??~=end F{ ~1>>>F; ∴:request processor} }
                {:check F}
            }skip it;
        }check F;
    }check ahead;
}two OK;
?{request processor; ~!!attempt to dispatch a processor on branch C;
    ??~=Failute{failure; ~!!! <2 processors are available, so issue warning message;
                "WARNING: Path not taken because <2 processors.~
                                    {:lead processor continues}
        }failure;
        {success;~
            ??~convergeType=FWD_ALL{v; ~!!create convergence array;
                                {:lead processor continues} }v;
            {lead processor continues; ~N>>>C; C+1>>>N; ~!!! see(+);
                ??end N{:Result 9}
                {:C Loop}
            }lead processor continues;
        }success;
}request processor;
?{Result 9; ~!!attempt to dispatch a processor on branch C;
    ??~=Failure{failure9; ~!!! <2 processors are available, so issue warning message;
                "WARNING: Path not taken because <2 processors.~
                                    {:lead processor continues 9}
        }failure9;
        {success9;~
            ??~convergeType=FWD_ALL{v9; ~!!create convergence array;
                                {:lead processor continues 9} }v9;
            {lead processor continues 9;
                {:Done}
            }lead processor continues 9;
        }success9;
}Result 9;
}BED;
```

EXPLANATION OF NUMBERED RESULTS

In the foregoing and the following, expressions such as "C is true" mean that the contingency associated with the branch numbered C in the branch table of the cell currently running the branch evaluator has evaluated to TRUE in the existential situation.

(1) C is true & non-exclusive OR is unconditional, AND N is also that way, IMPLIES Attempt to dispatch a new processor on branch C, with flag set for suspended state; then advance (i.e. "move ahead") both indices C and N and continue the main procession through the branch table (i.e., C loop), unless at the end of the Branch Table, in which case attempt to dispatch a new processor on the last branch (and then go to sleep at Done until the next input).

But before requesting a new processor, TWO OK must check that there are not ahead any true exclusives by first marching index F ahead of N until the end of the branch table. So, if F hits a true exclusive, lead processor goes out that branch (and we're done with branch selection, and finished running the BED).

If a new processor is not available, then we post a warning notification and skip branch C altogether, advancing C and N, and continue the main procession through the branch table (i.e., C loop). (Thereafter, eventually a processor may become available; or the lead processor may leave the cell via an exclusive branch and we're done with branch selection, and finished running the BED).

(2) C is false OR blocked, IMPLIES move ahead.

(3) C true AND exclusive, IMPLIES lead processor take branch indicated by value of index C; therefore finished with this cell. (Note: Gamma)

(4) C true or unconditional, AND, N true & exclusive, IMPLIES skip branch C and then lead processor take branch N—i.e., increment C so C==N, then do as in (3).

(5) C is true & nonexclusive OR is unconditional, AND, N is false OR blocked, IMPLIES:

Skip N (i.e., advance N, leaving C as it was) thus entering "spread mode" which considers (6, 7, 8), already knowing that the Cth item is TRUE.

(6) New N is true & exclusive, IMPLIES "forget about Cth branch" (i.e., put the value of N into C), then do as in (3).

(7) New N is false or blocked, IMPLIES "skip Nth branch", i.e., increase the spread by incrementing N, and then continue looping in spread mode.

(8) New N is true or unconditional, IMPLIES (leaving "spread mode") do same as (1), i.e., attempt to dispatch a new processor on branch C, etc.

(9) C is true & non-exclusive OR is unconditional, AND there are no more branches to consider, IMPLIES Attempt to dispatch a new processor on branch C, with flag set for suspended state, (handling any unavailability as in Result 1); then go to Done to sleep until the next input arrives.

(*) "now in spread mode" means N is diverging ahead of C+1 position.

(+) "spread mode will end . . ." means N resumes C+1 position after it goes, via TWO OK, through "request processor" to "lead processor continues" where N>>>C and C+1>>>N.

(Gamma) Result (3) also applies when C true and C is last or only branch.

Definitions of tests and meta-commands in the branch evaluator:

The respective "end" tests report TRUE or else whether the respective index C or N or F is past the end of the branch table. The other tests simply look at the descriptors of the branch table item respectively indexed by C or N or F, and report TRUE or else according to whether the particular branch's type matches (i.e., Blocked, Unconditional, Exclusive).

The Failure test, and REQUEST PROCESSOR. The meta-command "!!attempt to dispatch a processor on branch C" checks to see that there are (preferably at least TWO more) processors available, before it allocates ONE of them to branch number C and dispatches it on that branch. "??~=Failure" reports TRUE if <2 were available, in which case no action was taken.

The No test reports TRUE if the meta-command "!! test if Cth branch points to a sub-space cell of the current cell" finds that branch C is not an subspace path, according to the descriptors of the item number C in the branch table.

"{Done; ~!!sleep until next input;}" indicates the branch evaluator is through with branch evaluation for the most

| The test. . | is TRUE if . . . |
| --- | --- |
| endC | C is greater than the number of branches in the forward branch table. |
| Blocked C | Branch number C is designated "blocked". |
| Unconditional C | Branch number C is designated "unconditional". |
| Exclusive C | Branch number C is designated "exclusive conditional". |
| True C | The contingency on branch number C evaluated TRUE. |
| endN | N is greater than the number of branches in the forward branch table. |
| Blocked N | Branch number N is designated "blocked". |
| Unconditional N | Branch number N is designated "unconditional". |
| Exclusive N | Branch number N is designated "exclusive conditional". |
| True N | The contingency on branch number N evaluated TRUE. |
| endF | F is greater than the number of branches in the B ' T. |
| Exclusive F | Branch number F is designated "exclusive conditional". |
| True F | The contingency on branch number F evaluated TRUE. |
| Failure | No more processors were available to the branch evaluator. |
| No | The test, if Cth branch points to a subspace cell of the current cell, did not produce a TRUE result. |
| ??~F= 1 | --is an example of an explicit comparison conditional. |
| ?{Two OK; | This and similar cases represent a blocked space, indicating entry to it can only occur by reference to the enclosed cell name. (Blocked spaces in the branch evaluator are entered by evocation only, using an ordinary branch.) |
| ~ | The "tilde" character is used to indicate that what follows is not literal material, as would be assumed in the particular context, but rather operational material such as a command, meta-command, comment, operation, expression, name, etc. |
| !!sleep until next input; | --means the processor working the BED (the "lead processor") idles, or preferably the corresponding process (generically, "lead processionist") is suspended (i.e., placed in an inactive wait state that does not consume system processor resources) until the next input arrives to be considered by the BED in the same manner as the foregoing input. |

A meta-command like "compute the conditional for Cth item" computes, considering the existential situation, the conditional expression corresponding to branch number C at that moment. A subsequent True C test or True N test or True F test, reports the result of the corresponding computation as TRUE or false. The computation uses the individual conditional computing code module for the branch, which is reached via a relative address occupying the conditional computing code field of the item corresponding to the respectively C, N or F position in the branch table. (A conditional computing code section was installed at cell assembly time for each exclusive or nonexclusive conditional contingency). The computation also checks modulators associated with the particular branch, if any are, and forces a non-TRUE result if one of them is active.

recent input, so processionist ("processor") sleeps before looping back to BED.

"{Result 3; ~!!dispatch lead processor on branch C}" indicates taking the unique or final branch by the lead processor, so finished with branching for this cell.

Following the principles of this invention, other specific embodiments may be defined that depend on introducing a new behavior into browsers themselves, but have the disadvantage of not working with standard browsers, or simpler client terminal devices such as a touch-tone telephone set or simple interactive television (press button, or point & click) or simple interactive text terminal (such as the old VT-100). Thus it is a special advantage of implementing the invention at the level of the server, and even more so of using the cellular network programming method described in U.S. patent application No. 08/580,921, that the widest variety of browsers and other client terminals may be accommodated, and even different types served concurrently by the same system. For instance, a cellular network clump may be accessed using a touch tone phone interface and a web based interface concurrently.

The foregoing description is presented to enable any person skilled in the art to make and use the invention. Descriptions of specific designs are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

What is claimed is:

1. A server system for providing data to a client system across a communications network, the server system comprising:

means for providing a first tag representative of a desired action to the client system;

means for providing a first link in association with the first tag such that the client system asserts a first signal addressed to the server system on the communications network when the first tag is selected;

wherein the first tag and the first link are configured to be processed by the client system in a manner indistinguishable as to whether the desired action is immediate or deferred;

means for receiving the first signal;

means, in response to the receipt of the first signal, for determining whether the desired action should be deferred; and means for indicating that the first tag has been selected and that the desired action has been deferred.

2. The server system according to claim 1, further comprising:

means for providing a second tag to the client system;

means for providing a second link in association with the second tag such that the client system asserts a second signal addressed to the server system on the communications network when the second tag is selected;

means for receiving the second signal;

means, in response to the receipt of the second signal, for determining whether the first tag has been previously selected and whether the desired action has been deferred; and means for executing the desired action in the event that the first tag has been previously selected and the desired action has been deferred.

3. The server system according to claim 2, wherein the desired action includes requesting desired data from a second server system and wherein the means for executing the desired action includes means for asserting a request for the data on the communications network for the desired data to be returned to the client system.

4. The server system according to claim 3, wherein:

the means for providing the first and the second tags includes means for sending hypertext markup language (HTML) to the client system;

the client system includes HTML web browsing software;

the first signal and the second signal comprise universal resource locators (URLs) which each include a file name;

the means for determining whether the desired action should be deferred includes: a list of file names which are associated with deferred actions and means for comparing the file name in the URL for the first signal to the file names in the list; and the means for asserting a request for the data on the communications network comprises asserting a hypertext transfer protocol command on the communications network using a return address for the client system such that the desired data is returned to the client system.

5. The server system according to claim 4, wherein the file name in the first signal represents a non-existent file.

6. The server system according to claim 4, further comprising means for maintaining synchronization with web pages displayed by the HTML web browsing software.

7. The server system according to claim 6, wherein the means for maintaining synchronization includes embedding a command in each page of HTML provided by the server system such that the command causes a synchronization signal to be sent to the server system when the page is displayed by the HTML web browsing software.

8. A server system for providing data to a client system across a communications network, the server system comprising:

means for providing a structured publication to the client system;

wherein the structured publication includes at least one tag representative of a desired action which is outside the context of the structured publication;

means for providing a first link in association with the first tag such that the client system asserts a first signal addressed to the server system on the communications network when the first tag is selected;

means for receiving the first signal;

means, in response to the receipt of the first signal, for determining whether the desired action should be deferred;

means for suspending the desired action;

means for receiving an indication that the context of the structured publication is completed; and means, in response to such indication, for activating the desired action which had been suspended.

9. The server system according to claim 8, wherein the desired action includes requesting desired data from a second server system and wherein the means for executing the desired action includes means for asserting a request for the data on the communications network for the desired data to be returned to the client system.

10. The server system according to claim 9, wherein:

the means for providing the first tag includes means for sending hypertext markup language (HTML) to the client system;

the client system includes HTML web browsing software;

the first signal comprises a universal resource locator (URL) which includes a file name;

the means for determining whether the desired action should be deferred includes: a list of file names which are associated with deferred actions and means for comparing the file name in the URL for the first signal to the file names in the list; and the means for asserting a request for the data on the communications network comprises asserting a hypertext transfer protocol command on the communications network using a return address for the client system such that the desired data is returned to the client system.

11. The server system according to claim 10, wherein the file name in the first signal represents a non-existent file.

12. The server system according to claim 10, further comprising means for maintaining synchronization with web pages displayed by the HTML web browsing software.

13. A method for providing data to a client system across a communications network, comprising the steps of:

providing a first tag representative of a desired action to the client system;

providing a first link in association with the first tag such that the client system asserts a first signal addressed to the server system on the communications network when the first tag is selected;

wherein the first tag and the first link are configured to be processed by the client system in a manner indistinguishable as to whether the desired action is immediate or deferred;

receiving the first signal;

in response to the receipt of the first signal, determining whether the desired action should be deferred; and indicating that the first tag has been selected and that the desired action has been deferred.

14. The method of claim 13, wherein the desired action includes requesting desired data from a second server system and wherein the step of activating the desired action further comprises asserting a request for the data on the communications network for the desired data to be returned to the client system.

15. The method of claim 14, wherein:

the step of providing the first tag further comprises sending hypertext markup language (HTML) to the client system;

the client system includes HTML web browsing software;

the first signal comprises a universal resource locator (URL) which includes a file name;

the step of determining whether the desired action should be deferred further comprise: associating a list of file names with deferred actions and comparing the file name in the URL for the first signal to the file names in the list; and the step of asserting a request for the data on the communications network further comprises asserting a hypertext transfer protocol command on the communications network using a return address for the client system such that the desired data is returned to the client system.

16. A method according to claim 15, wherein the file name in the first signal represents a non-existent file.

17. A method according to claim 15, further comprising the step of maintaining synchronization with web pages displayed by the HTML web browsing software.

18. A method for providing data to a client system across a communications network, comprising the steps of:

providing a structured publication to the client system;

wherein the structured publication includes at least one tag representative of a desired action which is outside of the context of the structured publication;

providing a first link in association with the first tag such that the client system asserts a first signal addressed to the server system on the communications network when the first tag is selected;

receiving the first signal;

in response to the receipt of the first signal, determining whether the desired action should be deferred;

suspending the desired action;

receiving an indication of completion with respect to the context of the structured publication; and in response to such indication, activating the desired action which had been suspended.

19. The method of claim 18, wherein the desired action includes requesting desired data from a second server system and wherein the step of activating the desired action further comprises asserting a request for the data on the communications network for the desired data to be returned to the client system.

20. The method of claim 19, wherein:

the step of providing the first tag further comprises sending hypertext markup language (HTML) to the client system;

the client system includes HTML web browsing software;

the first signal comprises a universal resource locator (URL) which includes a file name;

the step of determining whether the desired action should be deferred further comprise: associating a list of file names with deferred actions and comparing the file name in the URL for the first signal to the file names in the list; and the step of asserting a request for the data on the communications network further comprises asserting a hypertext transfer protocol command on the communications network using a return address for the client system such that the desired data is returned to the client system.

21. A method according to claim 20, wherein the file name in the first signal represents a non-existent file.

22. A method according to claim 20, further comprising the step of maintaining synchronization with web pages displayed by the HTML web browsing software.

* * * * *